United States Patent [19]
Heinemann

[11] Patent Number: 5,802,238
[45] Date of Patent: Sep. 1, 1998

[54] CIRCUIT ARRANGEMENT FOR PROCESSING A COLOR SIGNAL AT A CARRIER FREQUENCY HIGHER THAN A CARRIER FREQUENCY AT WHICH THE COLOR SIGNAL HAD BEEN RECORDED

[75] Inventor: Herbert Heinemann, Pinneberg, Germany

[73] Assignee: U.S. Philips Corporation, New York, N.Y.

[21] Appl. No.: 677,002

[22] Filed: Jul. 8, 1996

[30] Foreign Application Priority Data

Jul. 7, 1995 [DE] Germany ............... 195 24 794.9

[51] Int. Cl.$^6$ .................................................. H04N 9/79
[52] U.S. Cl. ....................................... 386/25; 386/44
[58] Field of Search ............................. 386/22, 24, 25, 386/26, 28, 35, 41, 44; H04N 9/79, 5/92

[56] References Cited

U.S. PATENT DOCUMENTS

| | | | |
|---|---|---|---|
| 3,715,468 | 2/1973 | Fujita | 386/22 |
| 3,918,085 | 11/1975 | Numakura et al. | 386/22 |
| 4,178,606 | 12/1979 | Hirota | 386/24 |
| 4,695,877 | 9/1987 | Matsumoto | 386/22 |
| 4,745,493 | 5/1988 | Gedl et al. | 386/17 |
| 4,881,134 | 11/1989 | Grouthaus et al. | 386/22 |
| 4,991,026 | 2/1991 | Takase et al. | 386/22 |
| 5,062,004 | 10/1991 | Winterer et al. | 386/21 |
| 5,121,073 | 6/1992 | Pijnenburg et al. | 386/21 |

FOREIGN PATENT DOCUMENTS

0631446A1 12/1994 European Pat. Off. .

OTHER PUBLICATIONS

Philips Semiconductors Integrated Circuits Data Sheet TDA9715H/A , Aug. 1993.

Primary Examiner—Thai Tran
Attorney, Agent, or Firm—Edward W. Goodman

[57] ABSTRACT

In a circuit arrangement for processing a color subcarrier signal reproduced by a video recorder and modulated on a carrier with a first carrier frequency to let a comb filter circuit in the arrangement have the least possible required memory capacity, there is provided that the color subcarrier signal modulated on the first carrier frequency is applied to a first mixer (1) by which the color subcarrier signal is converted to a second carrier frequency which is higher than the first carrier frequency, that the output signal of the first mixer (1) is applied to a comb filter circuit (2, 3, 4) which suppresses adjacent track originating crosstalk color signals in the reproduced color signal, and that the output signal of the comb filter circuit (2, 3, 4) is applied to a second mixer (5) by which the comb-filtered signal is converted to a third carrier frequency which is higher than the second carrier frequency.

7 Claims, 1 Drawing Sheet

CIRCUIT ARRANGEMENT FOR PROCESSING A COLOR SIGNAL AT A CARRIER FREQUENCY HIGHER THAN A CARRIER FREQUENCY AT WHICH THE COLOR SIGNAL HAD BEEN RECORDED

BACKGROUND OF THE INVENTION

The invention relates to a circuit arrangement for processing a color under signal reproduced by a video recorder and modulated on a carrier with a first carrier frequency.

1. Field of the Invention

In accordance with the customary recording standards for video signals in consumer video recorders, more particularly with the VHS standard, there is provided that the color subcarrier signal is modulated on a carrier frequency that is lower than the carrier frequency on which the luminance signal is modulated. At the playback end, such a recorded color subcarrier signal can be converted to a higher carrier frequency which is devised in accordance with the color signal standard, for example, the PAL or NTSC standard. Furthermore, for video recorders, it is customary to suppress adjacent track originating crosstalk color signals in the reproduced color signal. Comb filters may be used for this purpose.

2. Description of the Related Art

In a known arrangement of this type, which is used in the Philips IC TDA 9715, this conversion to the nominal frequency of the chrominance carrier is effected upstream of the comb filter. This does have the advantage that the comb filter is already present in the frequency-controlled zone of the arrangement, but the comb filter is clocked with four times the chrominance carrier frequency. Since this arrangement already has the higher chrominance carrier frequency to which the signal was converted, there is a considerable need for storage capacity.

In another known arrangement of the type defined in the opening paragraph which is known from European Patent Application EP-A-631 446, the comb filter is inserted before the color subcarrier signal is converted to the higher carrier frequency in accordance with the color standard. This requires less storage capacity, it is true, but the comb filter circuit is directly supplied with the color subcarrier signal read from the tape. This color under signal may be subject to considerable fluctuations of the carrier frequency. They accompany, for example, changes to various reproduction speeds. When such fluctuations of the carrier frequency occur, the processing of the color signal, more particularly, in the comb filter circuit can no longer be effected in sync, so that subsequent circuits for processing the converted color signal get out of step. This is then manifested in a failure of the color reproduction.

SUMMARY OF THE INVENTION

It is an object of the invention to provide a circuit arrangement of the type defined in the opening paragraph, which allow for of the conversion and filtering of the color subcarrier signal with the least possible storage capacity and which is robust to fluctuations of the color carrier frequency of the signal read from the tape.

This object is achieved, according to the invention, in that the color subcarrier signal modulated on the first carrier frequency is applied to a first mixer by which the color under signal is converted to a second carrier frequency which is higher than the first carrier frequency, in that the output signal of the first mixer is applied to a comb filter circuit which suppresses crosstalk color signals from adjacent tracks in the reproduced color signal, and in that the output signal of the comb filter circuit is applied to a second mixer by which the comb-filtered signal is converted to a third carrier frequency which is higher than the second carrier frequency.

The color subcarrier signal read from the tape and modulated on a color carrier with a relatively low frequency is thus initially converted in a first mixer. The color carrier frequency is then converted to a second carrier frequency which is higher than the carrier frequency with which the color signal was read from the tape. Only the output signal of this first mixer is applied to a comb filter circuit which is used for suppressing adjacent track originating crosstalk color signals in the color subcarrier signal to be read. The output signal of the comb filter circuit is then applied to a second mixer in which this comb-filtered signal is converted to a carrier frequency as is provided in accordance with the color signal reproduction standard.

This twofold conversion of the color subcarrier signal read from the tape to two different carrier frequencies is particularly advantageous in that the comb filter circuit is connected downstream of the first mixer so that it is already situated in a zone of the circuit arrangement that is frequency converted and is thus controlled. Conversely, the comb filter circuit is not yet supplied with the signal converted to the color carrier frequency in accordance with the color signal reproduction standard, but a color signal which is converted to a color carrier that has a lower frequency. Consequently, the comb filter circuit can be clocked with the lower frequency than in the other case. This arrangement thus gains two advantages. On the one hand, the comb filter circuit is robust to fluctuations of the carrier frequency of the color signal read from the tape, because the comb filter is already connected in the controlled zone. On the other hand, the memory capacity needed for the comb filter circuit is relatively small, because the color signal applied thereto is modulated on a color carrier with a frequency lower than the carrier frequency of the color signal that corresponds to that of the comb filter circuit.

In accordance with an advantageous embodiment of the invention, there is provided that a third carrier frequency is the color carrier frequency that corresponds to a color signal standard. This is advantageous, because a further conversion of the color carrier frequency is no longer required in this manner.

If a color signal of the PAL standard is concerned, the third carrier frequency would in this case be 4.43 MHz as is shown in a further embodiment of the invention.

For reproducing a signal of the PAL standard, this signal would be read from the tape with a carrier frequency that is (40+⅛) times the duration of a picture line of the picture signal or color subcarrier signal respectively, as is shown in a further embodiment of the invention. In that case, the second carrier frequency to which the color subcarrier signal is converted by the first mixer can advantageously be 4.43/2 MHz. This halves the required memory capacity in the comb filter circuit as against the state of the art.

The operation of the first and second mixers, is such that they mix, with a mixing signal, the received color under signal which is modulated on a color carrier. This mixing signal is derived from the color carrier. As a result, fluctuations of the color carrier frequency are controlled so that these fluctuations hold for the mixing signal as they also do so for the color subcarrier signal to be mixed and also applied to the mixer, which color under signal is modulated on a carrier. As a result, the comb filter circuit, which is connected downstream of the first mixer in the arrangement according to the invention, is connected in the frequency-controlled zone of the arrangement.

For recovering the mixing signal in the circuit arrangement according to the invention, there is a possibility in a further embodiment of the invention that the first mixer is supplied with a mixing signal which is mixed with the color subcarrier signal modulated on the first carrier frequency, that the mixing signal is derived from an output signal of a voltage-controlled oscillator, and that the frequency of the output signal of the voltage-controlled oscillator is controlled in dependence on the output signal of a phase comparator whose input is supplied with a signal having half the third set carrier frequency and the output signal of the first mixer.

In this case, the mixing signal is controlled by the output signal of the phase comparator which comparator is supplied, on the one hand, with a signal having a first frequency, that is to say, half the set carrier frequency of the color signal in accordance with the color signal standard, and which is also supplied with the output signal of the first mixer of the arrangement. The phase comparison of these two signals yields the mixing signal which is applied to the first mixer. As a result, the output signal of the first mixer no longer exhibits fluctuations of the color carrier frequency. These fluctuations are leveled by said arrangement. In this manner, the first comb filter circuit is situated in the frequency-controlled zone and is robust to fluctuations of the color carrier frequency of the color subcarrier signal read from the tape as they occur, for example, in special operating modes.

A second possibility of deriving the mixing signal for the first mixer is that the first mixer is supplied with a mixing signal which is mixed with the color subcarrier signal modulated on the first carrier frequency, the mixing signal is derived from an output signal of a voltage-controlled oscillator, the frequency of the output signal of the voltage-controlled oscillator is controlled in response to the output signal of a phase comparator, whose input is supplied with a signal with the third nominal carrier frequency and with the output signal of the second mixer.

This second possibility, in principle, comprises a similar arrangement except that the phase comparator is supplied with the signal having the set carrier frequency and the output signal of the second mixer. In essence, there are no substantial differences compared with the first possibility of deriving the mixing signal for the first mixer.

These and other aspects of the invention will be apparent from and elucidated with reference to the embodiments described hereinafter.

DESCRIPTION OF THE PREFERRED EMBODIMENT

Figure 1:
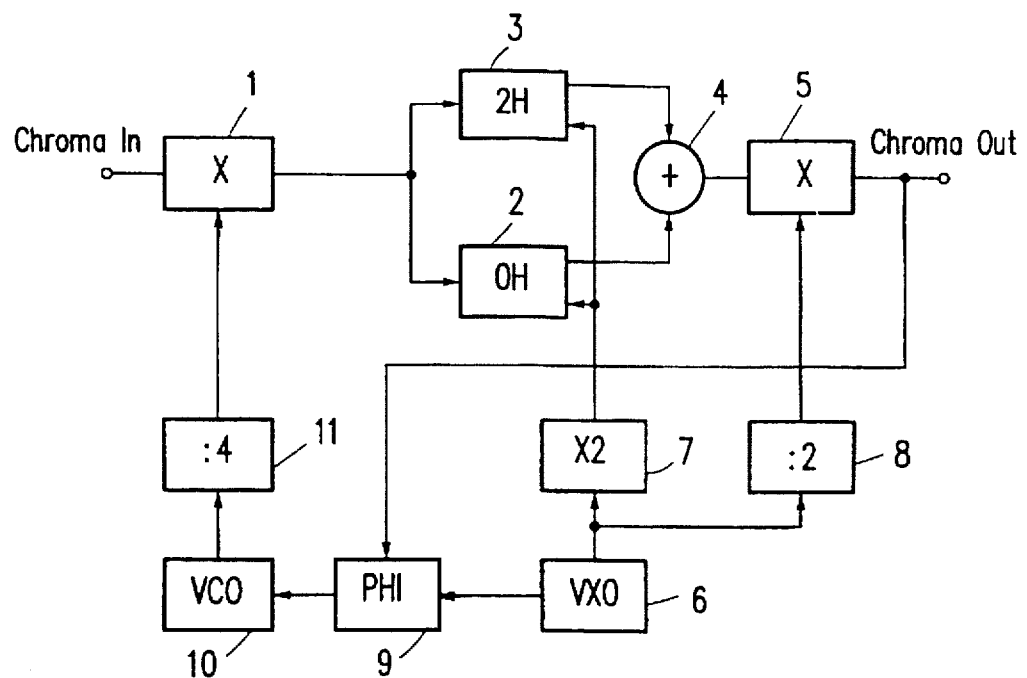
FIG. 1 shows a first embodiment of the circuit arrangement according to the invention in which the output signal of the second mixer is used for producing the mixing signal for the first mixer.

FIG. 1 shows in a block circuit diagram an embodiment for the circuit arrangement, according to the invention, for processing a signal reproduced by a video recorder and modulated on a carrier with a first carrier frequency, having a first mixer 1 at the input end. This mixer is supplied with the color subcarrier signal read from the tape and modulated on the first carrier frequency.

The output signal of this first mixer 1 is applied to a comb filter circuit which comprises a first delay circuit 2, a second delay circuit 3 and an adder 4.

The output signal of the first mixer is applied the input of the two delay circuits 2 and 3. The output signals, from the two delay circuit 2 and 3 are additively superimposed in the adder 4.

The first delay circuit 2 has a delay 0H, while the second delay circuit 3 a delay 2H. In this respect, H denotes the duration of one picture line of the reproduced picture signal or of the color signal contained in the picture signal. In the illustrative embodiment shown in FIG. 1 there is assumed that the color signal is a picture signal according to the PAL standard. In this case, since the output signals of the two delay circuits are superimposed, adjacent track originating crosstalk color signals in the actual color signal to be read out are suppressed because the undelayed color signal and the color signal delayed for the duration of two scanning lines are added together.

The first delay circuit 2 as such has only a very brief delay, but the color subcarrier signal applied thereto is applied to storage elements of the same type as occur in the second delay circuit 3. This achieves that the color signal in the first delay circuit 2, which does not itself delay the color signal, is subjected to the same amplitude response and thus the same distortions of the signal as the signal applied to the second delay circuit 3 which is delayed therein for the duration of two picture lines.

The output signal of the comb filter circuit, and thus the output signal of the adder 4, is applied to a second mixer 5. The output signal thereof forms the output signal of the circuit arrangement and is referenced Chroma Out in FIG. 1. Both the first mixer 1 and the second mixer 5 are each supplied with a mixing signal for the mixing operation. The mixing signal are produced by the arrangement to be described hereafter.

The circuit arrangement comprises a quartz clocked oscillator 6. It produces, on its output side, a signal having a frequency that corresponds to the color carrier frequency which corresponds to the reproduction standard of the read color signal. This is that is, not the color carrier frequency of the read signal, but the color carrier frequency with which the subsequent apparatus, for example, a television set, can further process the color signal. For example, when signals according to the PAL standard are concerned, this is the 4.43 MHz frequency.

The output signal of this oscillator 6 is applied to a multiplier 7 which multiplies this signal by 2. The output signal of this multiplier 7 is applied to the first delay circuit 2 and the second delay circuit 3 of the comb filter circuit for the purpose of timing this comb filter circuit.

The output signal of the oscillator 6 is furthermore applied to a divider circuit 8 which divides the signal by 2. The output signal of this divider circuit forms the mixing signal of the second mixers 5. In the second mixer mixing signal is mixed with the second input signal which second input signal is the output signal of the comb filter circuit and thus of the adder 4.

The output signal of the oscillator 6 further reaches a phase comparator 9 5 which is also supplied with the output signal of the second mixer 5. The phase comparator 9 produces a phase comparison signal from the two signals supplied thereto which is applied to a voltage-controlled oscillator. This voltage-controlled oscillator produces an output signal whose frequency depends on the voltage of the phase comparison signal supplied by the phase comparator 9. 10 The output signal of the voltage-controlled oscillator 10 is applied to a divider 11 which divides this signal by 4. The output signal of the divider 11 forms the mixing signal for the first mixer 1, in which this mixing signal is mixed with the input signal Chroma In applied to this mixer 1.

The color subcarrier signal read from the tape and modulated on a first color carrier frequency, which color subcarrier signal is applied to the first mixer, is converted thereby to a second carrier frequency. The illustrative embodiment shown in FIG. 1 is about half the color carrier frequency according to the color signal standard. This set color carrier frequency, according to the color signal standard, will be referenced $F_{SC}$ in the following. The voltage-controlled oscillator 10 operates, when there is no phase shift and, therefore, a zero voltage signal of the phase comparator, at an output frequency of $4(\frac{1}{2}F_{SC}+40\frac{1}{8}F_H)$. The color carrier frequency of the color subcarrier signal read from the tape, referenced Chroma In in FIG 1, is $(40\frac{1}{8}) F_H$. Herein $F_H$ denotes the horizontal frequency of the picture signal, and thus of the color subcarrier signal, thus the line frequency of these signals and $F_{SC}$, the set color carrier frequency according to the transmission standard of the color signals.

The choice of the frequency of the voltage-controlled oscillator and the division of its output signal by the divider 11, together with a mixing of its output signal and of the color subcarrier signal applied to the input of the circuit arrangement, brings about a conversion of the color carrier frequency to the frequency $\frac{1}{2} F_{SC}$. The color signal converted to this carrier frequency is applied to the comb filter circuit.

As a result, the frequency of the color carrier of this signal, in accordance with this illustrative embodiment, is only half as high as the frequency of the color carrier according to the reproduction standard of the color signal. This achieves that the two memories 2 and 3 of the comb filter circuit are to be timed with only a frequency 2 $F_{SC}$. Compared with prior art arrangements which are to be timed with 4 $F_{SC}$, there is achieved that only half the storage capacity in the memory circuits 2 and 3 is required.

The output signal of the comb filter circuit is converted to a third carrier frequency in the mixer 5. In the arrangement shown in FIG. 1, this frequency is $F_{SC}$, thus the color carrier frequency existing according to the color signal standard. In the example of the PAL standard, this frequency is 4.43 MHz. Thus, the second mixer 5 produces on its output a color signal that can be processed by a playback apparatus, for example, a television set.

This circuit arrangement not only requires less memory capacity but has, furthermore, the advantage that the comb filter circuit operates in the frequency-controlled range of the arrangement and is thus insensitive to frequency or phase fluctuations of the color carrier of the color subcarrier signal applied to its input. This property is obtained in that the phase comparator 9 makes a phase comparison of the quartz oscillator 6 and the color carrier frequency of the output signal of the second mixer. If the occasion arises that color fluctuations of the color carrier frequency of the input signal occur, these phase or frequency fluctuations will also occur in the output signal of the second mixer 5. The phase comparator 9 applies a respective correction signal to the voltage-controlled oscillator 10 which is consequently adjusted in that the output signal of the first mixer, and thus also the output signal of the second mixer 5, again has the set frequency. In this manner, frequency and phase fluctuations of the color carrier frequency of the input signal are leveled. For this purpose, the comb filter circuit i.e. its memories 2 and 3, is supplied with a color signal which is modulated with a color carrier frequency at a substantially constant frequency. In this manner, this comb filter circuit can show optimum performance.

Figure 2:
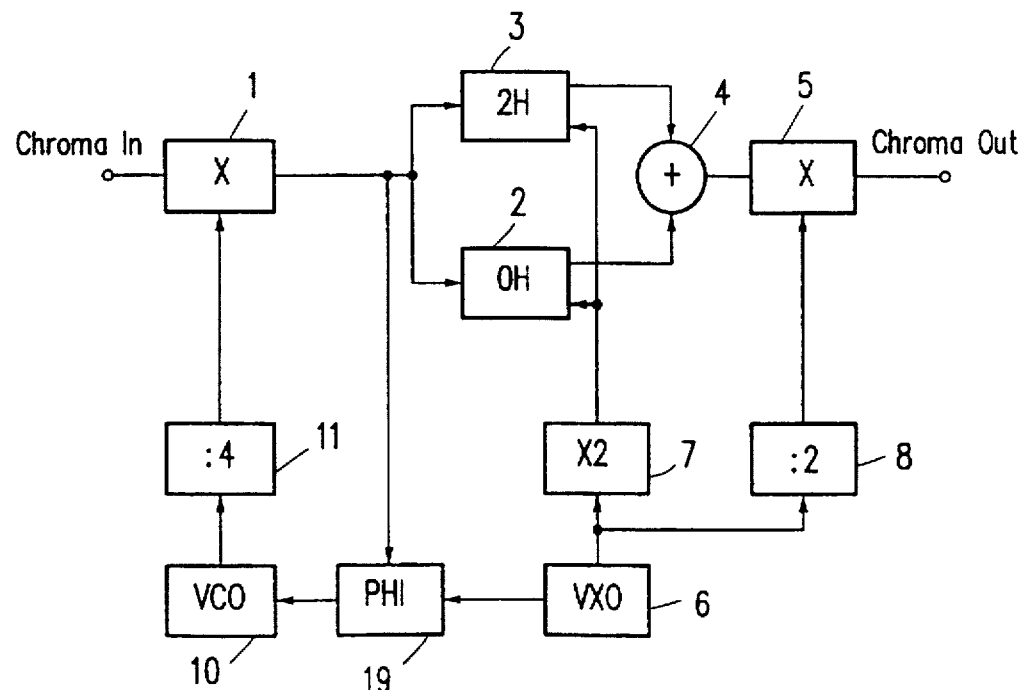
FIG. 2 shows a second embodiment of the arrangement in which the output signal of the first mixer is used for producing the mixing signal for the first mixer.

FIG. 2 shows a second embodiment for the circuit arrangement according to the invention which has the same circuit elements 1 to 11 which are connected in similar manner to the illustrative embodiment shown in FIG. 1, except for the phase comparator 9.

Instead of this phase comparator 9, the circuit arrangement shown in FIG. 2 comprises a phase comparator 19 which operates similarly to the phase comparator 9 of the circuit arrangement shown in FIG. 1. However, the phase comparator 19 shown in FIG. 2 is connected differently. The phase comparator 19 shown in FIG. 2 is supplied with the output signal of the divider 8. Furthermore, it is supplied with the output signal of the first mixer 1. The phase comparator 19 in the circuit arrangement shown in FIG. 2 thus compares the phase position of the output signal of the divider 8 and that of the first mixer 1.

The total circuit arrangement shown in FIG. 2 thus operates similarly to that shown in FIG. 1, except that the voltage-controlled oscillator receives a correction signal from the phase comparator 19, this correction signal being generated in response to the phase difference between these two signals. The basic operation of this circuit arrangement is not changed at all. In the design of the circuit arrangements shown in FIGS. 1 and 2, only the different absolute phase positions of the output signals of the first and second mixers is to be taken into account, these absolute phase positions being caused by phase delays resulting from the comb filter circuit or the two mixers 5, respectively. In the two circuit arrangements, phase or frequency fluctuations of the color carrier frequency of the color subcarrier signal read from the tape are leveled so that the comb filter circuit lies in the frequency-controlled zone, i.e., the comb filter circuit is supplied with the color under signal which is modulated on a constant color carrier frequency.

I claim:

1. A circuit arrangement for processing a color subcarrier signal reproduced by a video recorder and modulated on a carrier at a first carrier frequency, characterized in that said circuit arrangement comprises a first mixer to which the color subcarrier signal modulated on the first carrier frequency is applied, said first mixer converting the color subcarrier signal to a second carrier frequency which is higher than the first carrier frequency; a comb filter circuit having an input for receiving an output signal of the first mixer, said comb filter circuit suppressing crosstalk color signals from adjacent tracks in the color subcarrier signal; and a second mixer having an input for receiving an output signal of the comb filter circuit, said second mixer converting the output signal of the comb filter to a third carrier frequency which is higher than the second carrier frequency.

2. The circuit arrangement as claimed in claim 1, characterized in that the third carrier frequency is a color carrier frequency in accordance with a color signal standard.

3. The circuit arrangement as claimed in claim 2 for processing a PAL color signal, characterized in that the third carrier frequency is 4.43 MHZ.

4. The circuit arrangement as claimed in claim 1 for processing a PAL color signal, characterized in that the first carrier frequency is (40+⅛) times a duration of a picture line of a color subcarrier signal, and the second carrier frequency is 4.43/2 MHZ.

5. The circuit arrangement as claimed in claim 1, characterized in that the circuit arrangement further comprises a phase comparator having a first input for receiving a signal having the third carrier frequency and a second input coupled to receive the output signal from the first mixer; a voltage-controlled oscillator having a control input coupled to an output of said phase comparator; and means for deriving a mixing signal from an output signal of said voltage-controlled oscillator, said mixing signal being applied to an input of said first mixer for mixing with the color under signal modulated on the first carrier frequency.

6. The circuit arrangement as claimed in claim 1, characterized in that the circuit arrangement further comprises a phase comparator having a first input for receiving a signal having the third carrier frequency and a second input coupled to receive the output signal from the second mixer; a voltage-controlled oscillator having a control input coupled to an output of said phase comparator; and means for deriving a mixing signal from an output signal of said voltage-controlled oscillator, said mixing signal being applied to an input of said first mixer for mixing with the color under signal modulated on the first carrier frequency.

7. The circuit arrangement as claimed in claim 1, characterized in that said circuit arrangement comprises means for generating a mixing signal, said mixing signal being applied to both the second mixer and the first mixer, and said mixing signal corresponding to half the color carrier frequency; a fixed oscillator having an output coupled to a divider for supplying a fixed mixing frequency also corresponding to half the color carrier frequency, said fixed mixing frequency also being applied to said second mixer.

* * * * *